May 29, 1962 G. ZIELASEK 3,037,155

SEMI-CONDUCTOR DEVICE

Filed Dec. 16, 1959

INVENTOR

Gotthold Zielasek by: Michael S. Striker

Attorney 3,037,155
SEMI-CONDUCTOR DEVICE
Gotthold Zielasek, Stuttgart, Germany, assignor to Robert Bosch G.m.b.H., Stuttgart, Germany
Filed Dec. 16, 1959, Ser. No. 860,037
Claims priority, application Germany Oct. 12, 1957
22 Claims. (Cl. 317—234)

The invention relates to a semi-conductor device, and more particularly to such a device which has a steep current-voltage characteristic in the high conductivity range.

This application is a continuation-in-part of my application Serial No. 766,922, filed October 13, 1958, entitled "Semi-Conductor Device," now abandoned.

Crystal diodes and selenium rectifier elements have been employed as voltage sensitive elements in control circuits because of their property of permitting the passage of a relatively strong current above a critical narrow voltage range, and such devices have been employed successfully where such a critical voltage range of approximately 0.4 volt was satisfactory. Where the control device is intended to respond to a lower voltage, such conventional devices have been unsatisfactory because the non-linearity of their characteristic current-voltage curves in this voltage range is relatively small and the inclination of the curve is shallow.

A primary object of the invention is the provision of a device having a steep current voltage characteristic at low voltage values.

Another object is the provision of such a device the characteristic curve of which deviates from a substantially linear course at low voltage values.

Yet another object is to provide such a device which is of very small dimensions and occupies but a minimum of space.

A further object of the invention is to provide a device of the general type set forth, but having a current-voltage characteristic curve displaying a distinct break at comparatively low voltage values while being substantially rectilinear below and above said break, and rather steep above the break.

With these and other objects in view, the invention provides a semi-conductor device comprising a semi-conductor member having an n-portion and a p-portion containing an impurity prevalently of the acceptor type. The two portions are arranged contiguously adjacent each other so as to form an n-p junction therebetween. At least one of the portions of the semi-conductor member contains another impurity substantially incapable of acting as a donor or acceptor in the semi-conductor, but of such a nature and concentration as to increase the original conductivity of said semi-conductor for current flow across the p-n junction in a forward direction between the n- and p-portion under the influence of an externally applied voltage in a selected voltage-range.

In one aspect of the invention the second impurity is so selected that the current-voltage characteristic of the semi-conductor becomes generally steeper in the non-linear portion thereof as compared with the steepness of this portion as it would appear if said second impurity were not added.

In another aspect of the invention, the second impurity is so selected that the current-voltage characteristic of the semi-conductor exhibits a distinct break at a comparatively low voltage, the portions of the curve being substantially rectilinear below and above that break, and being comparatively very steep above the break.

The novel features which are considered as characteristic for the invention are set forth in particular in the appended claims. The invention itself, however, both as to its construction and its method of operation, together with additional objects and advantages thereof, will be best understood from the following description of specific embodiments, when read in connection with the accompanying drawings in which:

Figure 1:
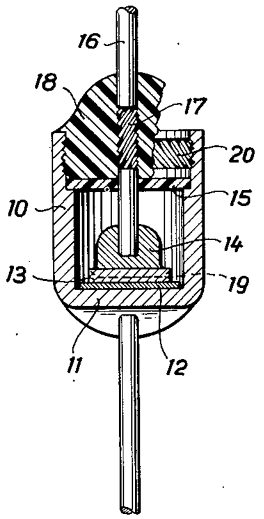
FIG. 1 is a sectional elevational view of an embodiment of the invention on an enlarged scale.

Referring now to the drawings, and particularly to FIG. 1, there is shown a cup-shaped element 10 made from copper sheet material by deep drawing and having approximate dimensions of 7 to 8 mm. height and 6 mm. diameter. To the bottom 11 of cup-shaped element 10, a lead wire is fastened from the outside and a semi-conductor disc 13 is fastened inside the cup-shaped member by soldering by means of an interposed disc 12 of a fusible metal such as tin. The semi-conductor disc 13 may consist of n-type germanium containing approximately one foreign atom for each $10^7$ atoms of germanium so that the germanium becomes n-conducting and has a specific resistivity of 0.1 ohm cm. The germanium disc 13 may have a thickness of approximately 0.3 mm. When indium is alloyed with a portion of such a germanium disc a p-n junction is formed which has a relatively poor rectifying effect.

A copper conductor 16 is soldered to that flat surface of the germanium disc 13 which is facing away from the bottom 11 of cup-shaped element 10 by means of an indium dot 14. The copper conductor 16 passes through the opening of cup-shaped element 10 and is electrically insulated from the latter by a disc 15 of insulating material. The portion 17 of conductor 16 is knurled, corrugated or otherwise provided with an irregular surface, the surface 20 of the cup-shaped element 10 facing the irregular surface 17 of conductor 16 is also made irregular by knurling or the like. The irregular surfaces 17 and 20 provide an anchorage for an insulating sealing plug 18 which may be produced by casting a synthetic embedding resin into the uppermost portion of cup-shaped member 10 above insulating disc 15.

The afore-described device is preferably assembled by soldering the pre-assembled components at a temperature of approximately 520° C. in a vacuum furnace or in a furnace containing a protective atmosphere. The tin layer 12 between the semi-conductor disc 13 and the bottom 11 of the cup-shaped member 10 is fused at this temperature and the disc 13 is soldered to the cup-shaped member. The indium dot 14 also melts and partially diffuses into germanium disc 13 so as to form a diffusion alloy containing an amount of indium which acts as an acceptor and results in the formation of a p-n junction between the alloyed and unalloyed portions of the semi-conductor as indicated at 19.

Figures 3, 4, 5:
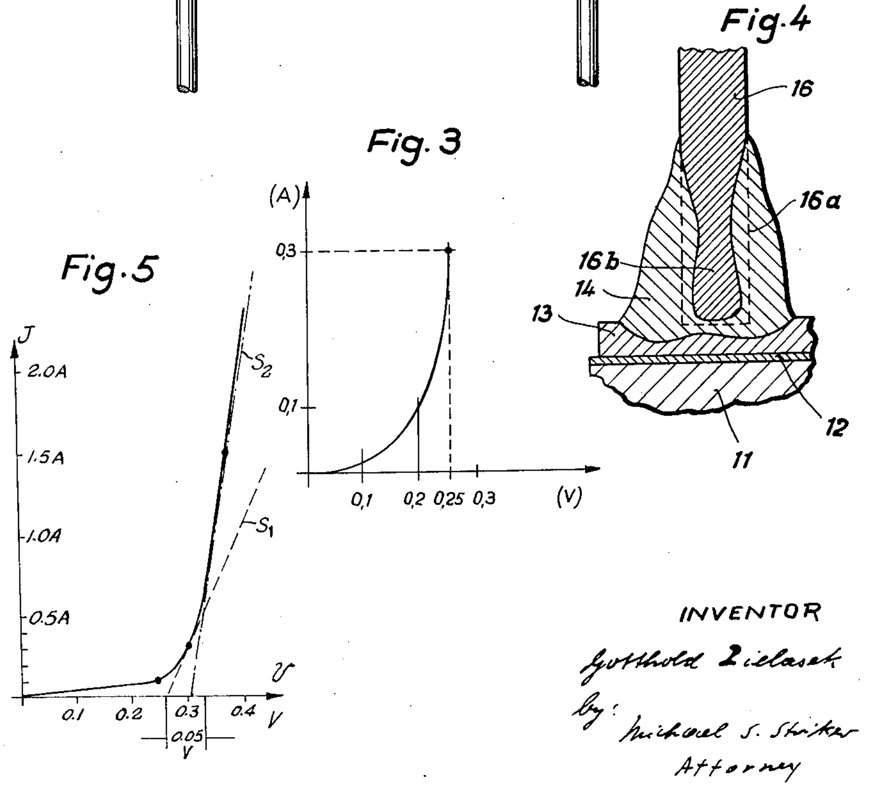
FIG. 3 shows the current-voltage characteristic curve obtainable with the devices of FIGS. 1 and 2.
FIG. 4 is a further enlarged detail of one of the embodiments of FIGS. 1 and 2.
FIG. 5 shows another current-voltage characteristic curve obtainable with the devices of FIGS. 1 and 2.

The structure at the junction of conductor 16, dot 14, disc 13 and cup-bottom 11 after completion of the diffusing operation is shown in detail and on a greatly enlarged scale in FIG. 4. The indium dot 14 originally had an indium content of not less than 99.999% and had originally a substantially cylindrical shape, the cylinder having a length of 1.5 mm. and a diameter of 1.8 mm. The conductor wire 16 is made of electrolytic copper and has a diameter of 0.8 mm.

The elements of the semi-conductor device are pre-assembled and introduced into the furnace with the conductor 16 supported on the top surface of the indium cylinder and held in axial alignment either by the insulating disc 15 or by a removable spacer disc, for example of graphite, which is later removed. When the temperature of the pre-assembled device is raised beyond the melting point of the indium, the conductor 16 penetrates into the softening indium dot under the force of gravity, and fused indium metal is drawn upward by capillarity to a small extent along the surface of conductor 16 as shown in FIG. 4. At the interface between the indium dot 14 and the germanium disc 13, the melting indium dissolves a portion of the surface material of the semi-conductor disc so as to form a germanium-indium alloy in which the indium predominates. A number of indium atoms diffuse from the interface into the germanium disc to form a p-type germanium-indium alloy in which the germanium predominates and which forms an n-p junction with that portion of the germanium disc in which the n-properties prevail.

At the interface of the indium with the copper conductor 16 diffusion alloys of indium and copper are formed in analogous manner. Because of the relatively great solubility of copper in indium, the diffusion alloy in which indium is the predominant component may penetrate in a relatively short time as deeply as 0.2 mm. into that portion of conductor 16 which is embedded in the indium dot 14. The portion of the original conductor 16 which is transformed into such an indium alloy is indicated in FIG. 4 at **16*a*, the portion of conductor 16 in which copper remains the predominant constituent being indicated by 16*b***.

The copper dissolved in the indium dot 14 partly penetrates through the liquid indium-germanium alloy and at least into the p-portion of the germanium disc 13. From the original dimensions of 1.8 mm. diameter and 1.5 mm. length of the indium cylinder and the reduction of the average diameter of the copper conductor 16 from 0.8 mm. to substantially 0.45 mm. it can readily be calculated that 0.6 $mm.^3$ of copper have been dissolved in an original volume of 3.9 $mm.^3$ of indium, so that the fused alloy contains copper in a ratio of substantially 1 part for every 6.5 parts of indium. The amount of germanium dissolved in the indium alloy is somewhat smaller but may be estimated from FIG. 4 which is drawn approximately to scale to be of the order of magnitude of 0.3 $mm.^3$.

Figure 2:
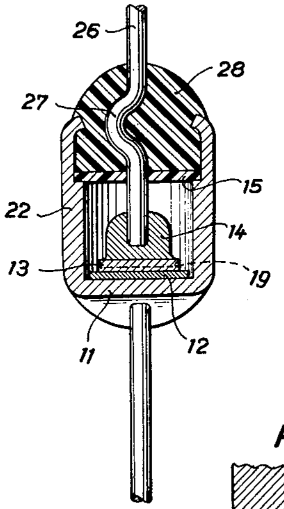
FIG. 2 is a sectional elevational view of another embodiment of the invention on an enlarged scale.

The embodiment of the invention illustrated in FIG. 2 differs from that of FIG. 1 in that the conductor wire 26 is provided with a double bend 27 on the level of the opening of cup-shaped element 22 for providing anchorage for the plug 28 of casting resin which seals the opening of cup-shaped member 22 after assembly of the semi-conductor device. In order to further improve the hold of the plug on the assembly the wall of member 22 is bent inward around the opening so as to prevent plug 28 from slipping axially outward from cup-shaped member 22.

FIG. 3 illustrates the characteristic current-voltage curve of the semi-conductor device of FIG. 1 or 2. It shows the shape normally encountered in diodes of the semi-conductor type in a qualitative manner with a first portion in which the current-voltage ratio is substantially constant, and a second portion in which the increase of current with applied potential becomes increasingly more rapid. The characteristic curve of the inventive device differs from that of a conventional diode in that the portion of substantially constant current-voltage ratio is relatively short and ends in a voltage range of substantially 0.1 volt, an appreciably lower voltage than that of the corresponding portion of the characteristic curve of a diode of the usual type, and becomes extremely steep at voltage values at which the increase of current with voltage is still only slight with the usual semi-conductor diodes.

This shape of the characteristic curve which makes the semi-conductor device of the invention sensitive to very low voltages for actuating a control device is due to the presence of copper in the semi-conductor described above. The copper atoms which in themselves are incapable of acting as donors or acceptors in the germanium, and which impair the rectifying effect of the n-p junction have been found to substantially increase the steepness of the characteristic current-voltage curve of the semi-conductor in the forward direction. Since a semi-conductor device of the type described is intended for use in direct current circuits, the reduced rectifying effect of the copper present in the semi-conductor on the rectifying effect is without relevance.

The low resistance of the described device at relatively low potentials applied to the conductor 16 or 26 and the bottom portion 11 of the cup-shaped member 10 or 22 is furthermore due to the very low contact resistances at the soldered connections in the device of the invention and to the relatively high copper concentration in the portions of the semi-conductor disc adjacent copper bottom 11 and copper conductor 16.

In order to achieve the desired high current-voltage ratio of approximately 20 amperes per volt in that portion of the characteristic curve of the device in which the critical voltage of the control circuit is reached, which is approximately 0.2 to 0.25 volt in the example illustrated in FIG. 3, it is necessary that the indium dot after completion of the fusing operation contain for every 10 parts of indium at least 1 part of copper, but not more than 50 parts of copper.

It has been found that semi-conductors of the general type referred to above are particularly well suited for being used as voltage regulators and stabilizers. This calls for a semi-conductor which has very low resistivity at comparatively high currents passing therethrough, and which have a current-voltage characteristic curve which has a distinct break in a selected narrow voltage range. It has been found further that the above-mentioned characteristics of a semi-conductor of the general type mentioned above can be obtained if the semi-conductor crystal has an impurity content at least 10 times higher than conventionally used for p-n-rectifiers, while the soldering metal consists of a material capable of furnishing acceptors in the case of an n-semi-conductor crystal, or capable of furnishing donors in the case of p-semi-conductor crystals, and contains, in addition, a substantial amount of a second impurity which is capable of increasing the conductivity of the semi-conductor. The content of this second impurity in the soldering metal should be at least $1/100$, but not more than $1/2$ of the soldering metal, while the soldering metal before the addition of the second impurity should be pure to 99.99%, preferably even 99.999%. The arrangement of the component parts of a semi-conductor device of the last mentioned type would not look different from the arrangement described above and illustrated by FIGS. 1 and 2, for example. Therefore, reference is had also now to FIGS. 1 and 2.

In the embodiment of the invention now to be described the semi-conductor disc 13 is produced by starting from highly purified germanium which contains at the maximum one atom of foreign material for $10^9$ to $10^{10}$ atoms of germanium. This germanium material is melted in a crucible while antimony is being added whereby the resulting alloy obtains n-conductivity. Hereafter a cylindrical monocrystal is drawn from the molten material in a well known manner. The introduction of antimony is such that the crystal contains one atom of antimony for $2.5 \times 10^6$ atoms of germanium. The resistivity of this alloy is comparatively low and is of the magnitude of 0.01 ohm-cm. By slicing the crystal perpendicularly to its longitudinal axis the discs 13 having a thickness of .3 mm. are obtained.

The assembly is completed as described above by soldering in one single operation, namely by heating the assembly to approximately 520° C. to 530° C. in a protective gas atmosphere or in vacuum, so that the indium material 14 penetrates partly into the germanium disc 13 forming an alloy therewith, with the result of the p-n-junction 19 being formed.

It has been found that particularly satisfactory results are obtained if the indium material 14 has a degree of purity of at least 99.99%, preferably even 99.999%. If the physical dimensions of the disc 13, the copper conductor 16 and of the indium cylinder are chosen in the same manner as described above with reference to the example of FIG. 1, the resulting volume proportions apply also to the present example. However, it should be noted that for obtaining the desired very high steepness of the current-voltage characteristic, e.g. in the range of 20 amps. per volt, it is necessary that in the final indium solder spot at least 1 part copper is present for every 100 parts of indium, but not more than 50 parts of copper.

FIG. 5 illustrates a current-voltage characteristic curve obtainable for a semi-conductor device of the type just described. As can be seen, this curve rises from the zero point slightly and almost rectilinearly up to 0.2 volt and indicates that this amount of voltage corresponds to a current of .08 amp. passing through the conductor. Upon application of a potential U of .25 volt the conductor carries a current J of .15 amp., and upon application of .3 volt a current of .3 amp. However, upon application of .35 volt a current J of 1.5 amps. is able to flow through the conductor. This indicates, that the substantial copper content in the solder material results in a form of the characteristic curve which has in the range between .2 volt to .3 volt a distinct break. The steepness of the curve $S=dJ/dU$ for a voltage $U=.2$ volt amounts to not more than .2 amp./.2 volt=1 amp./volt. However for $U=.3$ volt the steepness of the curve is at least .3 amp./.05 volt=6 amps./volt. If the antimony content of the semiconductor material is selected to be of the magnitude which is specified above, then a current-voltage characteristic of the semi-conductor as illustrated by FIG. 5 is obtained. This highly satisfactory form of the characteristic curve shows at .2 volt a steepness of only .5 amp./volt, however at .3 volt already a steepness $S_1$ of .5 amp./.05 volt=10 amps./volt, at .35 volt even a steepness $S_2$ of approximately 1.5 amps./.05 volt=30 amps./volt. In FIG. 5 tangent lines $S_1$ and $S_2$ are shown in dash-dot form so as to illustrate the corresponding values of steepness of the curve at the respective points.

The rapid increase of the current values above the .25 volt is mainly due to the fact that in the described structure only very low contact resistances exist at the soldering points and that, additionally, during the heating operation causing the soldering and the formation of alloys, copper atoms penetrate by diffusion in substantial quantities from the copper cup 10 and from the copper wire 16 into the germanium disc 13 whereby the conductivity of the germanium after cooling down to room temperature is greatly increased. It is true that at the same time the penetration of copper atoms impair the p-n-transition of current and reduce the rectifying effect i.e. reduce the capability of the semi-conductor to block the flow of current in the opposite direction. However, this is of no significance if the semi-conductor according to the invention is used for voltage regulation or stabilization because in this case the semi-conductor is not being used as a rectifier blocking the flow of current in one direction, but is used only for passing current in forward direction. The increase of steepness of the characteristic curve as obtained by the introduction of copper atoms into the semiconductor and appearing in the area of operation in which current passes through the semi-conductor, makes it possible to derive from very small voltages already very substantial regulating or control currents. It is of particular advantage that the distinct break of the characteristic curve appears practically in the voltage range between .2 and .3 volt, or at least between .25 volt and .35 volt, while the characteristic curve is practically rectilinear in the voltage range above .3 volt and below .2 volt.

It will be apparent to those skilled in the art that the desired results of the device of the invention may also be obtained by employing in the simultaneous soldering and alloying operation a dot, the material of which initially consists of a copper-indium alloy of the afore-described composition. In this case the conductor wire may consist of material which is insoluble in indium at the fusing temperature such as nickel. The copper required to increase the conductivity of the semi-conductor device is furnished by the indium-copper alloy.

The invention is not limited to any one of the materials used in the illustrative embodiments of the invention described in conjunction with the drawings. Germanium may be replaced as a material for the semi-conductor disc by such materials as silicon or intermetallic semi-conductive compounds which may be of the III–V type such as indium antimonide which may be alloyed with cadmium. Copper fastened to the semi-conductor element by tin solder may be employed as a base material with such semi-conductors other than germanium.

It will be understood that each of the elements described above or two or more together, may also find useful application in other types of semi-conductor devices differing from the type described above.

While the invention has been illustrated and described as embodied in a voltage-sensitive semi-conductor device, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a semi-conductor device, in combination, a semiconductor member having an n-portion; a first conductor member; a solder connection between said members; and a second conductor member conductively fastened to said n-portion of said semi-conductor member in spaced relationship to said solder connection, the material of said solder connection being partly diffused into a portion of said semi-conductor member and acting as acceptor in said portion, whereby an n-p junction is formed between the latter portion and said n-portion, a part of at least one of said conductor members being diffused into said semiconductor member so as to increase the conductivity thereof for forward current flow across said junction from one of said portions to the other, under the influence of a voltage externally applied to said conductors, in that current range in which the ratio of current to voltage would increase with current even in the absence of any diffusion of a part of said conductor member.

2. In a semi-conductor device, in combination, a semiconductor member of low-resistance germanium having an n-portion; a first conductor member; a solder connection between said members; and a second conductor member conductively fastened to said n-portion of said semiconductor member in spaced relationship to said solder connection, the material of said solder connection being partly diffused into a portion of said semi-conductor member and acting as acceptor in said portion, whereby an n-p junction is formed between the latter portion and said n-portion, a part of at least one of said conductor members being diffused into said semi-conductor member so as to increase the conductivity thereof for forward current flow across said junction from one of said portions to the other, under the influence of a voltage externally applied to said conductors, in that current range in which the ratio of current to voltage would increase with current even in the absence of any diffusion of a part of said conductor member.

3. In a semi-conductor device, in combination, a semi-conductor member having an n-portion; a first conductor member; a solder connection between said members; and a second conductor member conductively fastened to said n-portion of said semi-conductor member in spaced relationship to said solder connection, the material of said solder connection being partly diffused into a portion of said semi-conductor member and acting as acceptor in said portion, whereby an n-p junction is formed between the latter portion and said n-portion, at least one of said conductor members being of copper and a part thereof being diffused into said semi-conductor member so as to increase the conductivity thereof for forward current flow across said junction from one of said portions to the other, under the influence of a voltage externally applied to said conductors, in that current range in which the ratio of current to voltage would increase with current even in the absence of any diffusion of a part of said conductor member.

4. In a semi-conductor device as set forth in claim 3, said second conductor member being cup-shaped, the n-portion of said semi-conductor member being conductively fastened to the bottom of the inside of said cup-shaped member, and said first conductor member projecting from the opening of said cup-shaped member.

5. In a semi-conductor device as set forth in claim 4, at least one of said conductor members having an irregular surface facing said other member near said opening.

6. In a semi-conductor device, in combination, a semi-conductor member having an n-portion; a first conductor member; a solder connection between said members; and a second conductor member conductively fastened to said n-portion of said semi-conductor member in spaced relationship to said solder connection, the material of said solder connection being partly diffused into a portion of said semi-conductor member and acting as an acceptor in said portion, whereby an n-p junction is formed between the latter portion and said n-portion, the material of said solder connection consisting of indium alloyed with copper in a percentage composition of 1% to 80% copper a part of which is diffused into said semi-conductor member so as to increase the conductivity thereof for forward current flow across said junction from one of said portions to the other, under the influence of a voltage externally applied to said conductors, in that current range in which the ratio of current voltage would increase with current even in the absence of any diffusion of a part of said conductor member.

7. In a semi-conductor device, in combination, a semi-conductor member having an n-portion; a first conductor member; a solder connection between said members; and a second conductor member conductively fastened to said n-portion of said semi-conductor member in spaced relationship to said solder connection, the material of said solder connection being partly diffused into a portion of said semi-conductor member and acting as acceptor in said portion, whereby an n-p junction is formed between the latter portion and said n-portion, the material of said solder connection consisting of high purity indium containing not more than 0.001% impurities alloyed with copper in a percentage composition of 1% to 80% copper a part of which is diffused into said semi-conductor member so as to increase the conductivity thereof for forward current flow across said junction from one of said portions to the other, under the influence of a voltage externally applied to said conductors, in that current range in which the ratio of current to voltage would increase with current even in the absence of any diffusion of a part of said conductor member.

8. In a semi-conductor device, in combination, a semi-conductor member having an n-portion; a first conductor member; a solder connection between said members; and a second conductor member conductively fastened to said n-portion of said semi-conductor member in spaced relationship to said solder connection, the material of said solder connection being partly diffused into a portion of said semi-conductor member and acting as acceptor in said portion, whereby an n-p junction is formed between the latter portion and said n-portion, the material of said solder connection consisting of indium alloyed with copper in a percentage composition of 5–25% copper a part of which is diffused into said semi-conductor member so as to increase the conductivity thereof for forward current flow across said junction from one of said portions to the other, under the influence of a voltage externally applied to said conductors, in that current range in which the ratio of current to voltage would increase with current even in the absence of any diffusion of a part of said conductor member.

9. In a semi-conductor device, in combination, a semi-conductor member having an n-portion; a first conductor member; a solder connection between said members; and a second conductor member conductively fastened to said n-portion of said semi-conductor member in spaced relationship to said solder connection, the material of said solder connection being partly diffused into a portion of said semi-conductor member and acting as acceptor in said portion, whereby an n-p junction is formed between the latter portion and said n-portion, the material of said solder connection consisting of indium alloyed with copper in a percentage composition of substantially 14% copper a part of which is diffused into said semi-conductor member so as to increase the conductivity thereof for forward current flow across said junction from one of said portions to the other, under the influence of a voltage externally applied to said conductors, in that current range in which the ratio of current to voltage would increase with current even in the absence of any diffusion of a part of said conductor member.

10. In a semi-conductor device as set forth in claim 3, said second conductor member being cup-shaped, the n-portion of said semi-conductor member being soldered by tin to the bottom of the inside of said cup-shaped member, and said first conductor member projecting from the opening of said cup-shaped member.

11. In a semi-conductor device, in combination, a semi-conductor member of low-resistance germanium having an n-portion; a copper conductor member; an indium solder connection between said members; and a cup-shaped copper member, said n-portion of said semi-conductor member being soldered by tin to the bottom of the inside of said cup-shaped member, said conductor member being partly diffused into said solder connection, the material of said solder connection thus containing indium and copper and being partly diffused into a portion of said semi-conductor member, the diffused indium acting as acceptor in said latter portion, whereby an n-p junction is formed between the latter portion and said n-portion, and the diffused copper increasing the conductivity of said semi-conductor member for forward flow across said junction from one of said portions to the other, under the influence of a voltage externally applied to said conductor member and said cup-shaped member, in that current range in which the ratio of current to voltage would increase with current even in the absence of any diffusion of copper.

12. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member whereby the conductivity thereof for forward current flow across said junction from one of said portions to the other under the influence of a voltage externally applied to said conductors is slightly increased in a first selected lower voltage range and steeply increased in the adjoining higher voltage range.

13. In a semi-conductor device, in combination, a semi-conductor member of low-resistance germanium material having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member whereby the conductivity thereof for forward current flow across said junction from one of said portions to the other under the influence of a voltage externally applied to said conductors is slightly increased in a first selected lower voltage range and steeply increased in the adjoining higher voltage range.

14. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, at least one of said conductor members being of copper and a part thereof being diffused into said semi-conductor member whereby the conductivity thereof for forward current flow across said junction from one of said portions to the other under the influence of a voltage externally applied to said conductors is slightly increased in a first selected lower voltage range and steeply increased in the adjoining higher voltage range.

15. In a semi-conductor device as set forth in claim 14, said second conductor member being cup-shaped, the n-portion of said semi-conductor member being conductively fastened to the bottom of the inside of said cup-shaped member, and said first conductor member projecting from the opening of said cup-shaped member.

16. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member, the material of said solder connection consisting of indium alloyed with copper in a percentage composition of 1% to 50% copper a part of which is diffused into said semi-conductor member whereby the conductivity thereof for forward current flow across said junction from one of said portions to the other under the influence of a voltage externally applied to said conductors is slightly increased in first selected lower voltage range and steeply increased in the adjoining higher voltage range.

17. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member, the material of said solder connection consisting of high purity indium containing impurities in a range of only 0.001% to 0.01% alloyed with copper in a percentage composition of 1% to 50% copper a part of which is diffused into said semi-conductor member whereby the conductivity thereof for forward current flow across said junction from one of said portions to the other under the influence of a voltage externally applied to said conductors is slightly increased in first selected lower voltage range and steeply increased in the adjoining higher voltage range.

18. In a semi-conductor device, in combination, a semi-conductor member having one of the two possible n- or p-characteristics; a first conductor member; a solder connection between said member; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member, the material of said solder connection consisting of indium alloyed with copper in a percentage composition of 5% to 25% copper a part of which is diffused into said semi-conductor member whereby the conductivity thereof for forward current flow across said junction from one of said portions to the other under the influence of a voltage externally applied to said conductors is slightly increased in first selected lower voltage range and steeply increased in the adjoining higher voltage range.

19. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member, the material of said solder connection consisting of high purity indium containing impurities in a range of only 0.001% to 0.01% alloyed with copper in a percentage composition of 5% to 25% copper a part of which is diffused into said semi-conductor member whereby the conductivity thereof for forward current flow across said junction from one of said portions to the other under the influence of a voltage externally applied to said conductors is slightly increased in first selected lower voltage range and steeply increased in the adjoining higher voltage range.

20. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member, the material of said solder connection consisting of indium alloyed with copper in a percentage composition of about 14% copper a part of which is diffused into said semi-conductor member whereby the conductivity thereof for forward current flow across said junction from one of said portions to the other under the influence of a voltage externally applied to said conductors is slightly increased in first selected lower voltage range and steeply increased in the adjoining higher voltage range.

21. In a semi-conductor device, in combination, a semi-conductor member having one of the two possible n- or p-characteristics; a first conductor member; a solder connection between said members; and a second conductor member conductively fastened to said semi-conductor member in spaced relationship to said solder connection, the material of said solder connection being partly diffused into a portion of said semi-conductor member and acting to change said portion to assume the opposite one of said characteristics while leaving the remaining portion unchanged, whereby an n-p junction is formed in said semi-conductor member between said portions thereof, a part of at least one of said conductor members being diffused into said semi-conductor member, the material of said solder connection consisting of high purity indium containing impurities in a range of only 0.001% to 0.01% alloyed with copper in a percentage composition of about 14% copper a part of which is diffused into said semi-conductor member whereby the conductivity thereof for forward current flow across said junction from one of said portions to the other under the influence of a voltage externally applied to said conductors is slightly increased in first selected lower voltage range and steeply increased in the adjoining higher voltage range.

22. In a semi-conductor device as set forth in claim 14, said second conductor member being cup-shaped, the n-portion of said semi-conductor member being soldered by tin to the bottom of the inside of said cup-shaped member, and said first conductor member projecting from the opening of said cup-shaped member.

References Cited in the file of this patent

UNITED STATES PATENTS

| | | |
|---|---|---|
| 2,646,536 | Benzer et al. | July 21, 1953 |
| 2,781,481 | Armstrong | Feb. 12, 1957 |
| 2,813,233 | Shockley | Nov. 12, 1957 |
| 2,945,286 | Dorendorf | July 19, 1960 |